United States Patent
Nishimura et al.

(10) Patent No.: US 7,443,934 B2
(45) Date of Patent: Oct. 28, 2008

(54) METHOD AND APPARATUS FOR DETECTING SIGNALS, AND TRANSMITTING APPARATUS AND RECEIVING APPARATUS USING THE SAME

(75) Inventors: Naoaki Nishimura, Gifu (JP); Tomokazu Okita, Nishinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 512 days.

(21) Appl. No.: 11/086,676

(22) Filed: Mar. 23, 2005

(65) Prior Publication Data

US 2005/0213645 A1 Sep. 29, 2005

(30) Foreign Application Priority Data

Mar. 23, 2004 (JP) ............... 2004-085117

(51) Int. Cl.
*H04L 27/06* (2006.01)
(52) U.S. Cl. .................. 375/343; 375/340
(58) Field of Classification Search .......... 375/130, 375/140, 141, 142, 143, 146, 147, 150, 152, 375/229, 295, 316, 340, 343, 345, 350

See application file for complete search history.

(56) References Cited

U.S. PATENT DOCUMENTS

| | | | | |
|---|---|---|---|---|
| 5,134,406 A * | 7/1992 | Orr | ............... | 342/20 |
| 5,572,552 A * | 11/1996 | Dent et al. | ............... | 375/343 |
| 5,596,582 A * | 1/1997 | Sato et al. | ............... | 370/509 |
| 5,654,991 A * | 8/1997 | Andren et al. | ............... | 375/355 |
| 5,894,473 A * | 4/1999 | Dent | ............... | 370/342 |
| 6,507,603 B1 * | 1/2003 | Haga et al. | ............... | 375/147 |
| 6,847,261 B2 * | 1/2005 | Iwata et al. | ............... | 330/279 |
| 6,912,243 B1 * | 6/2005 | Ishioka | ............... | 375/147 |
| 2001/0010703 A1 * | 8/2001 | Ohsuge | ............... | 375/148 |
| 2002/0159534 A1 * | 10/2002 | Duncan et al. | ............... | 375/260 |
| 2003/0058037 A1 * | 3/2003 | Makita et al. | ............... | 329/304 |
| 2004/0131125 A1 * | 7/2004 | Sanderford et al. | ............... | 375/261 |

FOREIGN PATENT DOCUMENTS

| | | |
|---|---|---|
| JP | 08-340276 | 12/1996 |
| JP | 2001-136149 | 5/2001 |
| JP | 2003-078469 | 3/2003 |
| JP | 2003-283374 | 10/2003 |
| WO | WO 01/59950 A1 | 8/2001 |

OTHER PUBLICATIONS

Japanese Office Action, with English Translation, issued in corresponding Japanese Patent Application No. JP 2004-085117, mailed on Dec. 11, 2007.

* cited by examiner

*Primary Examiner*—Tesfaldet Bocure
(74) *Attorney, Agent, or Firm*—McDermott Will & Emery LLP (57) ABSTRACT

The strength of a signal which has been frequency-converted by an radiofrequency unit is measured, and the start of a signal detection processing is decided if the measured strength of a signal becomes greater than a predetermined threshold value. When the start of a signal detection processing is notified, the signal which has been frequency-converted by the radiofrequency unit is amplified. A correlation value for each sampling timing is generated from signals outputted from an analog-to-digital unit. A statistical processing is performed on the correlation values outputted from the matched filter unit, over a plurality of symbols. The correlation values on which the statistical processing has been performed is averaged. The averaged correlation value by a coefficient is multiplied. It is determined that a signal to be received has been detected if the maximum value from a selector is large.

11 Claims, 11 Drawing Sheets

METHOD AND APPARATUS FOR DETECTING SIGNALS, AND TRANSMITTING APPARATUS AND RECEIVING APPARATUS USING THE SAME

BACKGROUND OF THE INVENTION

1. Field of the Invention

The present invention generally relates to the signal detecting techniques, and it particularly relates to method and apparatus for detecting if the received signals contain a predetermined signal, and transmitting apparatus and receiving apparatus utilizing the same.

2. Description of the Related Art

As a spread spectrum communication system using the radio frequency of 2.4 GHz band, the wireless LAN (Local Area Network) of IEEE802.11b standard has been developed and put to practical use. This wireless LAN realizes the maximum transmission rate of 11 Mbps by CCK (Complementary Code Keying) modulation. The signals, such as preambles or headers, which contain control signals therein are produced by spreading DBPSK- or DQPSK-modulated signals with spread codes. Here, DBPSK stands for Differential Binary Phase Shift Keying and DQPSK Differential Quadrature Phase Shift Keying. A receiving apparatus in the spread spectrum communication system like this is generally provided with a matched filter. The matched filter outputs correlation values of the received signals and the spreading codes. When the received signals are inputted continuously to the matched filter, large correlation values are outputted in constant cycles. Upon receiving such a large correlation value, the receiving apparatus judges that the received signal is a signal to be processed, and then it carries out the receiving processing of received signals. The receiving apparatus also carries out the timing synchronization in the receiving processing, based on the timing at which the large correlation value is detected (See Reference (1) in the following Related Art List, for instance).

RELATED ART LIST (1) Japanese Patent Application Laid-Open No. Hei08-340276.

The strength of signals received by the receiving apparatus generally fluctuates greatly due to the fading effect in the wireless transmission path between the receiving apparatus and the transmitting apparatus or the distance therebetween. Even if the correlation value exceeds a threshold value, the receiving apparatus cited in Reference (1) does not judge at once that the signal is one to be processed. Instead, the maximum value of correlation values for each symbol is multiplied together over a plurality of symbols, and this multiplication result is compared with a threshold value so as to finally decide if the signal to be processed is detected. However, there is a possibility that the maximum value of correlation values cannot be accurately detected in the multi-path fading environment or in the environment of low SNR (Signal to Noise Ratio). That is, there are cases where the maximum value of correlation values cannot be detected at the proper detection timing and the maximum value of correlation values are detected at the false timing because the noise adversely contributes to the maximum value due to the effect of multipath and noise. If the receiving apparatus cannot accurately detect the maximum value of correlation values, the signals to be processed cannot be received and the transmission error of signals is caused.

SUMMARY OF THE INVENTION

The present invention has been made in view of the foregoing circumstances and problems and an objective thereof is to provide method and apparatus for detecting the receiving of signals even in an environment in which the characteristics of wireless transmission path causes difficulty in the transmission of radio signals, and transmitting apparatus and receiving apparatus using the same.

A preferred mode of carrying out the present invention relates to a signal detecting apparatus. This apparatus comprises: a sampling unit which samples respectively a plurality of symbols contained in a signal to be received, at an interval less than or equal to that of a symbol; a correlation unit which generates respectively a plurality of correlation values by performing correlation processing on the plurality of symbols sampled by the sampling unit; a selector which selects a maximum value of correlation values contained in one symbol interval among the plurality of correlation values generated by the correlation unit wherein the maximum value is one that has undergone statistical processing over the plurality of symbols; a statistical processing unit which performs statistical processing on the plurality of correlation values generated by the correlation unit; and a detector which determines detection of the signal to be received, based on the maximum value selected by the selector and the correlation values on which the statistical processing has been performed.

By employing the above apparatus, not only the maximum value but also the correlation values that have been subjected to the statistical processing are used. Hence, the effects of noise contained in the signal and multipath components can be taken into account and therefore the signals to be received can be accurately detected.

The apparatus may further comprise: a start determining unit which measures the strength of the signal to be received and determines a start of signal detection processing if the strength of the measured signal becomes greater than a predetermined threshold value; and an amplification unit which amplifies the strength of the plurality of symbols contained in the signal to be received, based on an automatic gain control, when the start of signal detection processing is determined and which outputs the amplified strength thereof to the sampling unit. The selector may associate respectively the plurality of correlation values generated by the correlation unit to timings to be sampled included in an interval of one symbol, perform statistical processing on the plurality of associated correlation values in the respective timings to be sampled, and select a maximum value from among the plurality of correlation values on which the statistical processing has been performed. The selector may be such that the statistical processing is performed by an IIR filter. The detector may divide the selected maximum value by a correlation value on which the statistical processing has been performed and decide on detection of the signal to be received if the division result is greater than a predetermined threshold value. The apparatus may further comprise an instruction unit which instructs the sampling unit, the correlation unit, the selector, the statistical processing unit and the detector to start their operations when the start of signal detection processing is determined.

By implementing the above apparatus, automatic gain control is performed before detecting signals, so that the correlation values can be accurately derived without increasing the distortion and noise in the signals. Moreover, the sampling unit and other units are operated after the start of signal detection processing has been determined, so that the power consumption can be reduced.

Another preferred mode of carrying out the present invention relates to a method for detecting signals. This method comprises: sampling respectively a plurality of symbols contained in a signal to be received, at an interval less than or equal to that of a symbol; generating respectively a plurality of correlation values by performing correlation processing on the plurality of symbols sampled by the sampling; selecting a maximum value of correlation values contained in one symbol interval among the plurality of correlation values generated by the generating wherein the maximum value is one that has undergone statistical processing over the plurality of symbols; performing statistical processing on the plurality of correlation values generated by the generating; and determining detection of the signal to be received, based on the maximum value selected by the selecting and the correlation values on which the statistical processing have been performed.

The method may further comprise: measuring the strength of the signal to be received and determining a start of signal detection processing if the strength of the measured signal becomes greater than a predetermined threshold value; and amplifying the strength of the plurality of symbols contained in the signal to be received, based on an automatic gain control, when the start of signal detection processing is determined and outputting the amplified strength thereof to the sampling unit. The selecting may associate respectively the plurality of correlation values generated by the generating to timings to be sampled included in an interval of one symbol, perform statistical processing on the plurality of associated correlation values in the respective timings to be sampled, and select a maximum value from among the plurality of correlation values on which the statistical processing has been performed. The selecting may be such that the statistical processing is performed by an IIR filter. The detecting may be such that the selected maximum value is divided by a correlation value on which the statistical processing has been performed and the detection of the signal to be received is determined if the division result is greater than a predetermined threshold value. The method may further comprise instructing the sampling, the generating respectively a plurality of correlation values, the selecting, the performing statistical processing and the determining the detection to start the operations when the start of signal detection processing is determined.

Still another preferred mode of carrying out the present invention relates to a receiving apparatus. This apparatus comprises: a sampling unit which samples respectively a plurality of symbols contained in a signal to be received, at an interval less than or equal to that of a symbol; a correlation unit which generates respectively a plurality of correlation values by performing correlation processing on the plurality of symbols sampled by the sampling unit; a selector which selects a maximum value of correlation values contained in one symbol interval among the plurality of correlation values generated by the correlation unit wherein the maximum value is one that has undergone statistical processing over the plurality of symbols; a statistical processing unit which performs statistical processing on the plurality of correlation values generated by the correlation unit; a detector which determines detection of the signal to be received, based on the maximum value selected by the selector and the correlation values on which the statistical processing has been performed; and a processing unit which processes the plurality of symbols in the event that the detection of the signal to be received is determined.

Still another preferred mode of carrying out the present invention relates to a transmitting apparatus. This apparatus comprises: a sampling unit which samples respectively a plurality of symbols contained in a signal to be received, at an interval less than or equal to that of a symbol; a correlation unit which generates respectively a plurality of correlation values by performing correlation processing on the plurality of symbols sampled by the sampling unit; a selector which selects a maximum value of correlation values contained in one symbol interval among the plurality of correlation values generated by the correlation unit wherein the maximum value is one that has undergone statistical processing over the plurality of symbols; a statistical processing unit which performs statistical processing on the plurality of correlation values generated by said correlation unit; a detector which determines detection of the signal to be received, based on the maximum value selected by said selector and the correlation values on which the statistical processing has been performed; and a transmitter which transmits a predetermined signal in the event that the signal to be received is not detected.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

FIRST EMBODIMENT

Before describing the present invention in a specific manner, an outline of the present invention will be described first. A first embodiment according to the present invention relates to a receiving apparatus of wireless LAN that conforms to the IEEE802.11b standard. The receiving apparatus receives signals transmitted from a transmitting apparatus via the wireless transmission path. As described earlier, the characteristics of wireless transmission path is such that it fluctuates greatly. That is, there may be a case where the strength of a desired signal is small and therefore the strength of noise is relatively large and there may be another case where the strength of a desired signal is large and therefore the strength of noise is relatively small. Generally, the former case makes it difficult for the signals to transmit smoothly. A receiving apparatus according to the present embodiment performs a correlation processing on a signal which has been subjected to spectrum-spreading, and detects from the received signal a signal to be processed, based on a result of the correlation processing. The receiving apparatus is equipped with the following two techniques to accurately detect the signal to be processed even in the wireless transmission path having difficulty transmitting the signals.

One technique is such that received signals are amplified by automatic gain control (AGC) before the correlation is performed on the received signals, namely, the signals which have been subjected to the spectrum-spreading. Normally, AGC has operated after the signal to be processed has been detected, so that the detection of a signal to be processed is performed based on a result obtained after the received signal is amplified at full gain and then subjected to a correlation processing. Hence the signal, to be processed, which is contained in the received signal is distorted and moreover the noise contained in the received signal is amplified. (Hereinafter a "signal to be processed" will also be referred to as a "processed signal".) As a result, the correlation value will no longer be correct one. According to the present invention, on the other hand, the signal amplified by AGC is subjected to a correlation processing, so that the distortion components of the processed signal contained in the received signal becomes small and moreover the noise contained in the received signal becomes relatively small.

The other technique is such that a ratio of a maximum value of correlation values to an average value thereof is calculated and the thus calculated ratio is compared with a threshold value so as to determine the detection of a signal. In other words, since the determination is conducted based on not only an absolute-like or categorical value, such as the only maximum value of correlation values, but also the relative values, the accurate determination without being adversely affected by the difference in the characteristics of the wireless transmission paths can be conducted. For example, if the strength of a desired signal is large and the strength of noise is small, a ratio of the maximum value of correlation values to the average value thereof becomes large. If, however, the strength of a desired signal is large and the strength of noise is also large, the ratio of the maximum value of correlation values to the average value thereof becomes small. That is, the correlation values of received signals are normalized or standardized according to the strength of noise.

Furthermore, the receiving apparatus according to the present embodiment detects accurately the signals to be processed, and at the same time performs a statistical processing on the maximum value of correlation values and the average value thereof by an infinite impulse response (IIR) filter in order to reduce the circuit scale. The effect of noise can be reduced by this statistical processing. Since the IIR filter is used, the statistical processing can be executed in a circuit scale smaller than when an FIR filter is used.

An outline of CCK modulation in the IEEE802.11b will be described since this scheme is assumed, for example, in the present embodiments. In the CCK modulation, 8 bits constitute one unit (hereinafter this unit will be referred to as "CCK modulation unit") and these 8 bits are called d1, d2, ..., d8 counted from the highest order. The lower-order bits [d3, d4], [d5, d6] and [d7, d8] among the CCK modulation units are respectively mapped to constellations of QPSK. The thus mapped phases will be indicated respectively by ($\phi 2$, $\phi 3$, $\phi 4$). Eight kinds of spread codes P1 to P8 are generated from the phases $\phi 2$, $\phi 3$ and $\phi 4$, as follows:

$P1 = \phi 2 + \phi 3 + \phi 4$ $P2 = \phi 3 + \phi 4$ $P3 = \phi 2 + \phi 4$ $P4 = \phi 4$ $P5 = \phi 2 + \phi 3$ $P6 = \phi 3$ $P7 = \phi 2$ $P8 = 0$ (Equations 1)

On the other hand, the higher-order 2 bits [d1, d2] among the CCK modulation units are mapped to a constellation of DQPSK, and it is assumed here that the thus mapped phase is $\phi 1$. It is to be noted that $\phi 1$ corresponds to a spread signal. From the spread signal $\phi 1$ (i.e., the signal being spread) and spread codes P1 to P8, the following 8 ways of chip signals, namely, X0 to X7 are generated.

$X0 = e^{j(\phi 1 + P1)}$ $X1 = e^{j(\phi 1 + P2)}$ $X2 = e^{j(\phi + P3)}$ $X3 = -e^{j(\phi 1 + P4)}$ $X4 = e^{j(\phi 1 + P5)}$ $X5 = e^{j(\phi 1 + P6)}$ $X6 = -e^{j(\phi 1 + P7)}$ $X7 = e^{j(\phi 1 + P8)}$ (Equations 2)

The transmitting apparatus transmits the chip signals in the order of X0 to X7 (hereinafter a unit in time sequence composed by chip signals X0 to X7 will be referred to "CCK modulation unit", too). In the IEEE802.11b, the phase-modulated signals of DBPSK or DQPSK, in addition to the CCK modulation, are spread by known spread codes and then transmitted.

Figure 1:
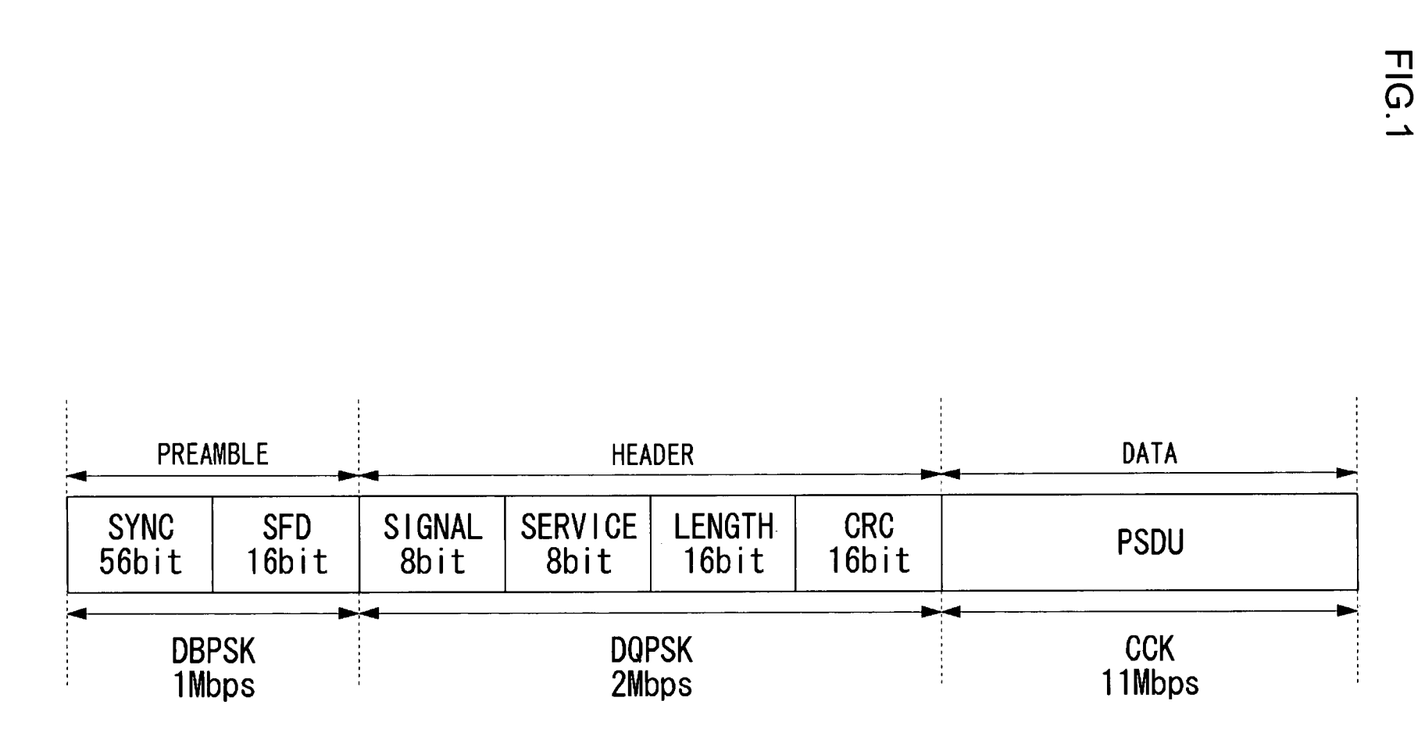
FIG. 1 illustrates a burst format of a communication system according to a first embodiment of the present invention.

FIG. 1 illustrates a burst format according to the first embodiment of the present invention. This burst format corresponds to ShortPLCP of IEEE802.11b standard. As shown in FIG. 1, the burst signal includes a preamble, a header and a data region. The preamble is communicated by a modulation scheme of DBPSK at a transmission rate of 1 Mbps, the header is communicated by a modulation scheme of DQPSK at a transmission rate of 2 Mbps and the data is communicated by a modulation scheme of CCK at a transmission rate of 11 Mbps. The preamble includes 56-bit SYNC and 16-bit SFD, and the header includes 8-bit SIGNAL, 8-bit SERVICE, 16-bit LENGTH and 16-bit CRC. On the other hand, length of PSDU that corresponds to the data is variable. The burst signals to be processed in the present invention is not limited to the signal as shown in FIG. 1. However, the description of a processing for the burst format shown in FIG. 1 will be given hereinbelow for the sake of simplicity.

Figure 2:
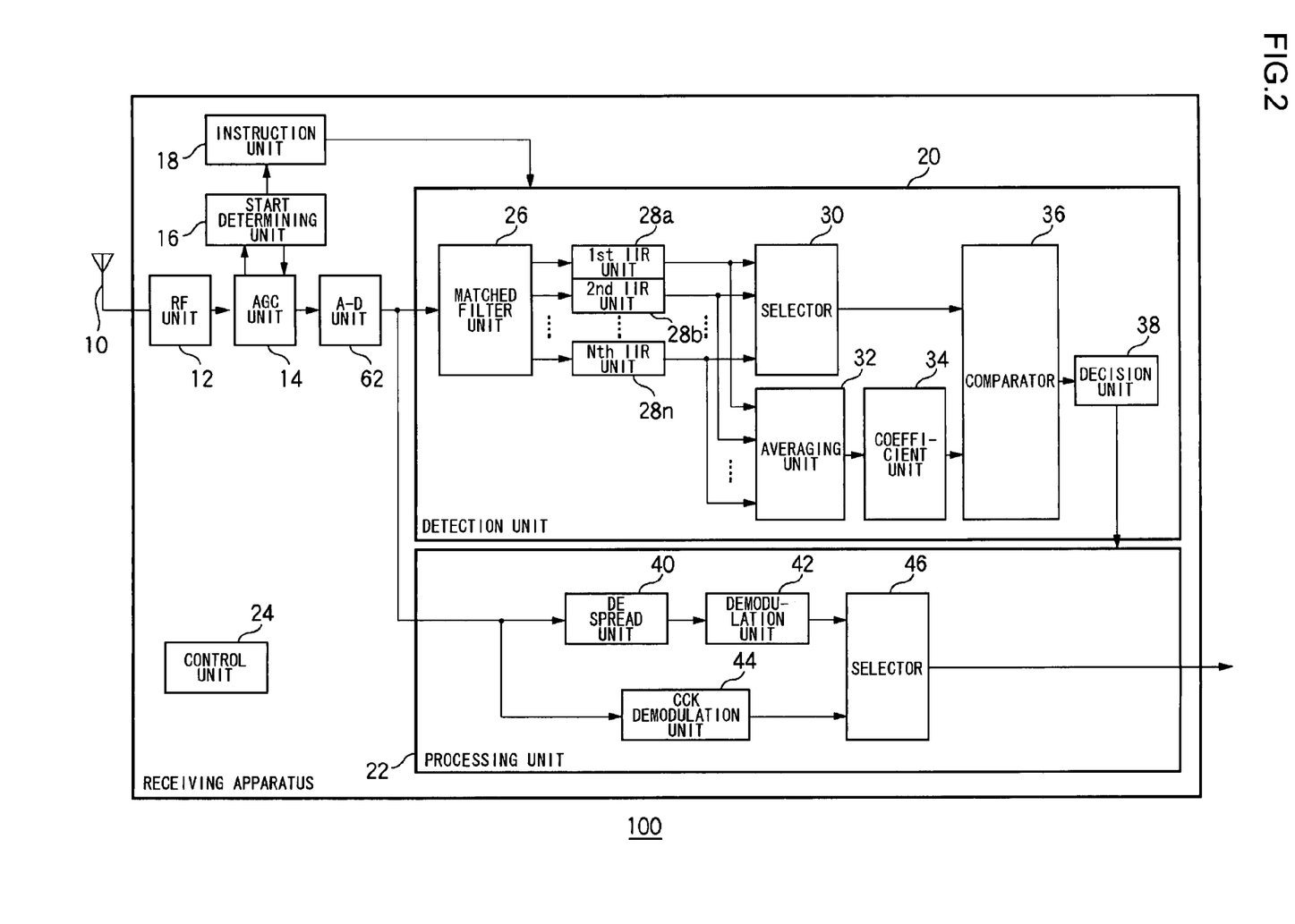
FIG. 2 illustrates a structure of a receiving apparatus according to a first embodiment of the present invention.

FIG. 2 illustrates a structure of a receiving apparatus 100 according to the first embodiment of the present invention. The receiving apparatus 100 includes an RF unit 12, an AGC unit 14, an A-D unit 62, a start determining unit 16, an instruction unit 18, a detection unit 20, a processing unit 22 and a control unit 24. The detection unit 20 includes a matched filter unit 26, a first IIR unit 28a, a second IIR unit 28b, . . . and an Nth IIR unit 28n, which are generically called IIR units 28, a selector 30, an averaging unit 32, a coefficient unit 34, a comparator 36 and a decision unit 28. The processing unit 22 includes a despread unit 40, a demodulation unit 42, a CCK demodulation unit 44 and a selector 46.

An antenna 10 receives signals transmitted from a transmitting apparatus, not shown. The received signal is subjected to spectrum spreading, has a burst format as shown in FIG. 1 (hereinafter, a signal having such a burst signal will be referred to as a "burst signal") and is a signal of radio frequency band. It is to be noted that there may be a case where the received signal does not have a burst format shown in FIG. 1 and it is noise that does not contain a desired signal. The RF unit 12 performs a frequency conversion on the signal of radio frequency band received by the antenna 10.

The start determining unit 16 measures the strength of a signal which has been frequency-converted by the RF unit 12, and determines the start of a signal detection processing if the measured strength of a signal becomes greater than a predetermined threshold value. That is, the RF unit 12 and the start determining unit 16 are active even in a period during which the antenna 10 is not receiving any burst signals, and other components are then stopped and resume the operation based on the decision on the start of a signal detection processing by the start determining unit 16.

When the start of a signal detection processing is conveyed from the start determining unit 16, the AGC unit 14 starts an automatic gain-control and amplifies the signal which was frequency-converted by the RF unit 12. Here, when a gain is determined in the automatic gain control, the AGC unit 14 stops the automatic gain control and fixes the gain at the thus determined gain. The gain in the AGC 14 is set to full gain until the start determining unit 16 decides on the start of a signal detection processing. The A-D unit 62 performs analog-to-digital conversion of a signal amplified by the AGC unit 14. The receiving apparatus 100 is subject here to a wireless LAN system compliant with the IEEE802.11b standard, and such a wireless LAN system is spread by a spreading code whose one symbol is comprised of 11 chips. Furthermore, since one chip is sampled twice, one symbol is sampled 22 times. As a result, the sampling interval in the A-D unit 62 becomes ½₂ symbol interval which is less than one symbol interval.

Figure 3:
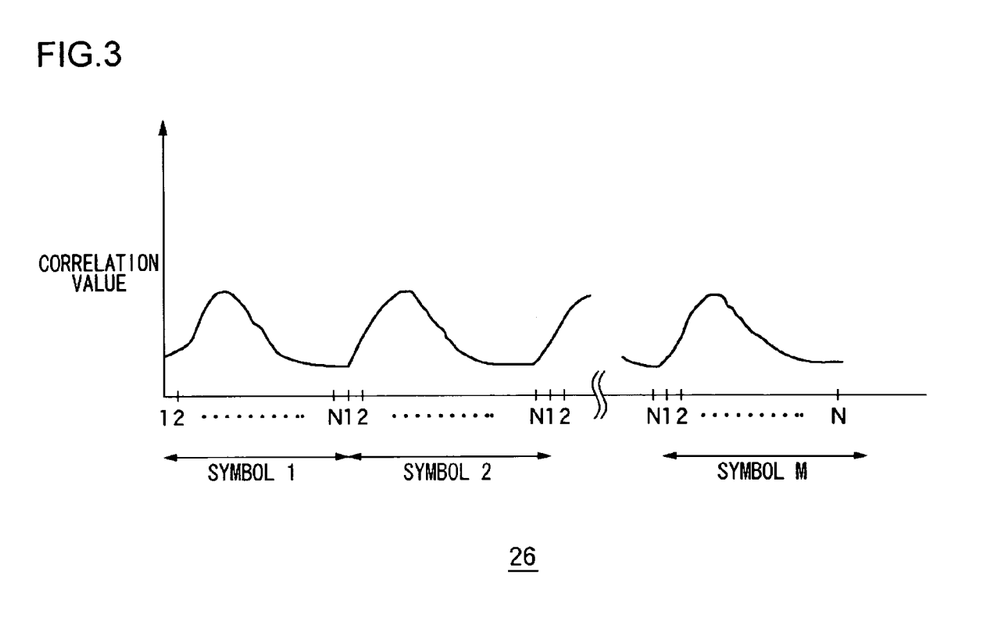
FIG. 3 shows a waveform of a signal which has been subjected to a correlation processing by a matched filter unit shown in FIG. 2.

The instruction unit 18 instructs the detection unit 20 to start its operation when the start of a signal detection processing is notified from the start determining unit 16. The matched filter unit 26 performs a correlation processing, for each sampling timing, on the signal outputted from the A-D unit 62, and generates correlation values for the each sampling timing. Here, the correlation processing is one performed between the signal outputted from the A-D unit 62 and a signal of a preamble area stored beforehand. FIG. 3 shows a waveform of a signal which has been subjected to correlation processing by the matched filter unit 26. In FIG. 3, the horizontal axis represents time and the vertical axis represents correlation values. Here, the correlation values corresponding to M symbols are outputted and one symbol is sampled N times. As described earlier, "N times" is equivalent to 22 times. The matched filter unit 26 outputs correlation values for each sampling timing.

In other words, a correlation value of "1"st sampling of "symbol 1", a correlation value of "1"st sampling of "symbol 2", . . . and a correlation value of "1"st sampling of "symbol M" shown in FIG. 3 are outputted to the first IIR unit 28a provided in a subsequent stage. In similar manner, a correlation value of "2"nd sampling of "symbol 1", a correlation value of "2"nd sampling of "symbol 2", . . . and a correlation value of "2"nd sampling of "symbol M" shown in FIG. 3 are outputted to the second IIR unit 28b provided in the subsequent stage. Likewise, a correlation value of "n"th sampling of "symbol 1", a correlation value of "n"th sampling of "symbol 2", . . . and a correlation value of "n"th sampling of "symbol M" shown in FIG. 3 are outputted to the Nth IIR unit 28n provided in the subsequent stage.

The IIR units 28 perform statistical processing, for each sampling timing over a plurality of symbols, on correlation values outputted from the matched filter unit 26. The effect of noise can be reduced by this statistical processing. The selector 30 inputs from the IIR units 28 the correlation values corresponding to the number of samplings for one symbol, and selects the maximum value among the inputted correlation values. That is, for each of a plurality of sampling timings contained in the interval of one symbol, a plurality of correlation values generated by the matched filter unit 26 are subjected to the statistical processings by the IIR units 28, and the maximum value is selected from among the correlation values which have been subjected to the statistical processings. In this manner, the maximum value is selected not from a single set of correlation values but based on a result where a plurality of correlation values were subjected to the statistical processings, so that the effect of noise can be reduced.

The averaging unit 32 performs another statistical processing, namely, averaging processing, over one symbol interval, on the correlation values obtained from the IIR units 28. The coefficient unit 34 multiplies the correlation value averaged by the averaging unit 32, by a coefficient. The coefficient is set to "2", "4" or the like, for instance. The comparator 36 compares the maximum value from the selector 30 with the magnitude of an average value multiplied by the coefficient from the coefficient unit 34. If the maximum value from the selector 30 is larger as a result of comparison by the comparator 36, the decision unit 38 determines that the signal to be received has been detected. That is, the maximum value is divided by the average value obtained through the processings by the selector 30, the averaging unit 32, the coefficient unit 34, the comparator 36 and the decision unit 38, and if the result of the division is greater than a predetermined value which is "2" or "4" here set by the coefficient unit 34, the detection of a signal to be received is determined. When the decision unit 38 makes decision that a signal to be received has been detected, such decision is conveyed accordingly to the processing unit 22, thus starting the operation of processing unit 22.

In order to despread the phase-modulated signals, such as preamble and header regions in the burst format shown in FIG. 1, which have been spread by the spread codes, the despread unit 40 performs correlation processing on signals outputted from the A-D unit 62, using said spread codes. The correlation processing may be a sliding type correlation processing or a matched-filter type correlation processing. As described earlier, the despread unit 40 normally operates in the areas of "preamble" and "header" of a burst format shown in FIG. 1. If, however, the data is a phase-modulated signal which has been spread by a predetermined spread code, the despread unit 40 also operates even in the area of "data". The demodulation unit 42 demodulates a despread signal which has been despread by the despread unit 40. Since the modulation scheme of despread signals is DBPSK or DQPSK, the demodulation is carried out through differential detection.

The CCK demodulation unit 44 performs calculation of fast Walsh transformation (FWT) on a value corresponding to a CCK-modulated signal as in the data area of a burst format shown in FIG. 1, and outputs a Walsh transform value. More specifically, a chip signal in CCK modulation unit is inputted and 64 Walsh transform values, namely, 64 correlation values, are generated through correlation processing among chip signals. Then, one Walsh transform value is selected based on the magnitude of 64 Walsh transform values, and d1, d2, . . . and d8 of information signals to be transmitted are recovered and outputted.

The selector 46 selects either a signal outputted from the demodulation unit 42 or a signal outputted from the CCK demodulation unit 44. In the interval of "preamble" and "header" regions shown in FIG. 1 the signal outputted from the demodulation unit 42 is selected whereas in the interval of "data" region the signal outputted from the CCK demodulation unit 44 is selected. The control unit 24 controls timings of the receiving apparatus 100.

In terms of hardware, the above-described structure can be realized by a CPU, a memory and other LSIs of an arbitrary computer. In terms of software, it can be realized by memory-loaded programs which have managing and scheduling functions or the like, but drawn and described herein are function blocks that are realized in cooperation with those. Thus, it is understood by those skilled in the art that these function blocks can be realized in a variety of forms such as by hardware only, software only or the combination thereof.

Figure 4A:
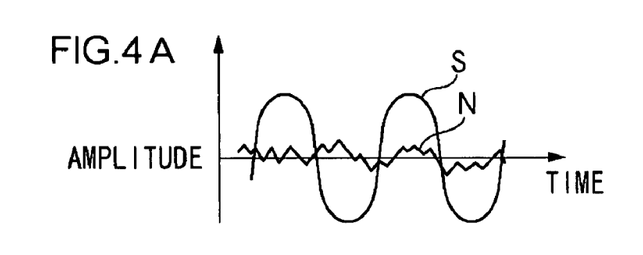
FIGS. 4A to 4C show waveforms of a signal amplified by an AGC unit shown in FIG. 2.
Figure 4B:
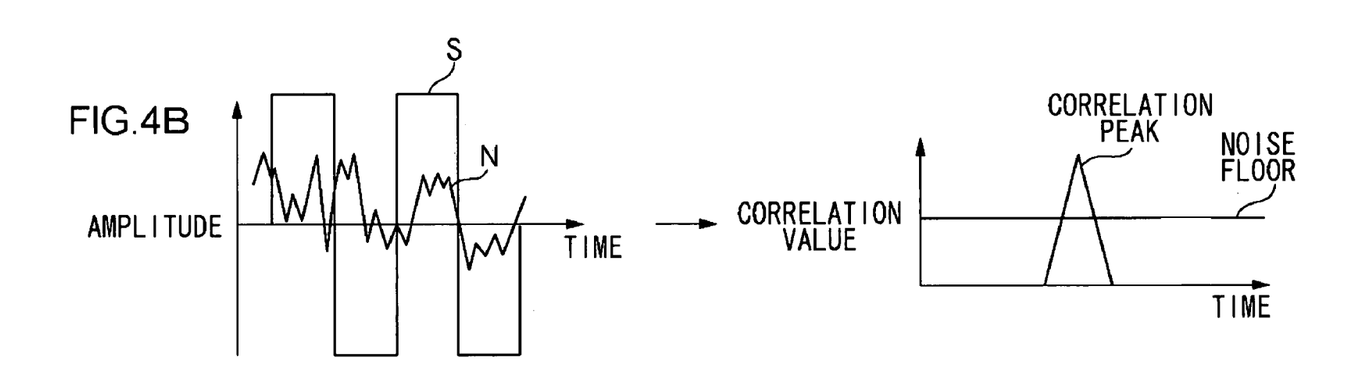
Figure 4C:
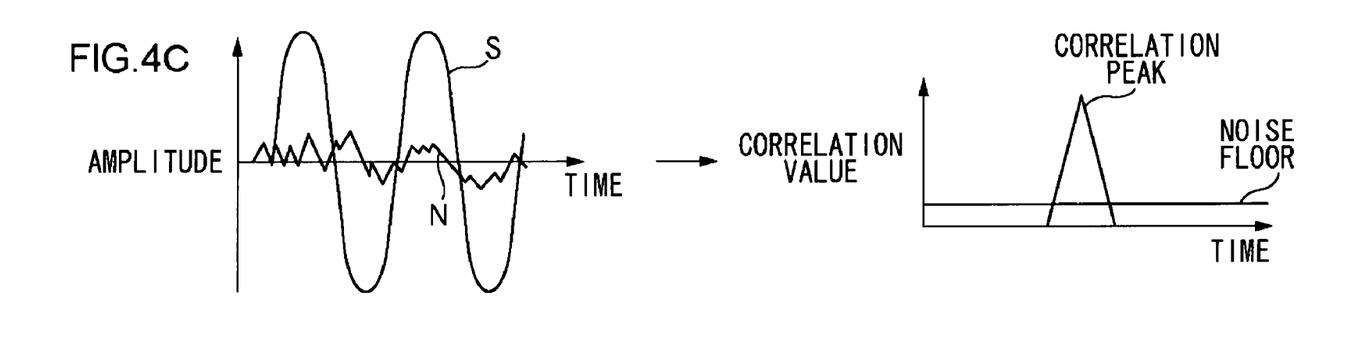

FIGS. 4A to 4C illustrate waveforms of a signal amplified by the AGC unit 14. FIG. 4A shows the waveform of a signal inputted to the AGC unit 14. In each of FIGS. 4A to 4C, a signal component "S" and a noise component "N" are shown separately from each other, and it is assumed that "S" is a sinusoidal wave. FIG. 4B shows the waveform where a signal inputted is amplified at full gain. The signal component "S" is deformed from a sinusoidal wave into a rectangular wave, so that the distortion in a signal is enlarged. The noise component "N" is also enlarged. That is, the distortion and the noise in a signal are enlarged. The right-side portion, indicated by the arrow mark, of FIG. 4B shows a result where the distortion and noise therein have been subjected to correlation processing through the matched filter unit 26 of FIG. 2. Though the correlation peak is detected by performing the correlation on the signal component "S", the noise floor thereof becomes also high because the noise component is amplified. Under these circumstances, it is generally difficult to detect the correlation peak due to the fluctuation of the noise component.

FIG. 4C shows the waveform of a signal amplified by the AGC unit 14 according to the first embodiment. As is evident from FIG. 4C, the amplified signal maintains a similar waveform to that of the signal inputted shown in FIG. 4A. The right-side portion, indicated by the arrow mark, of FIG. 4C shows a result where these waveforms have been subjected to correlation processing through the matched filter unit 26 of FIG. 2. The correlation peak is detected by performing the correlation on the signal component "S" and moreover the noise floor thereof becomes low. Under these circumstances, it is generally easy to detect the correlation peak even if the noise component fluctuates. According to the present embodiment, the signals to be processed are detected based on the signals as shown in FIG. 4C.

Figure 5:
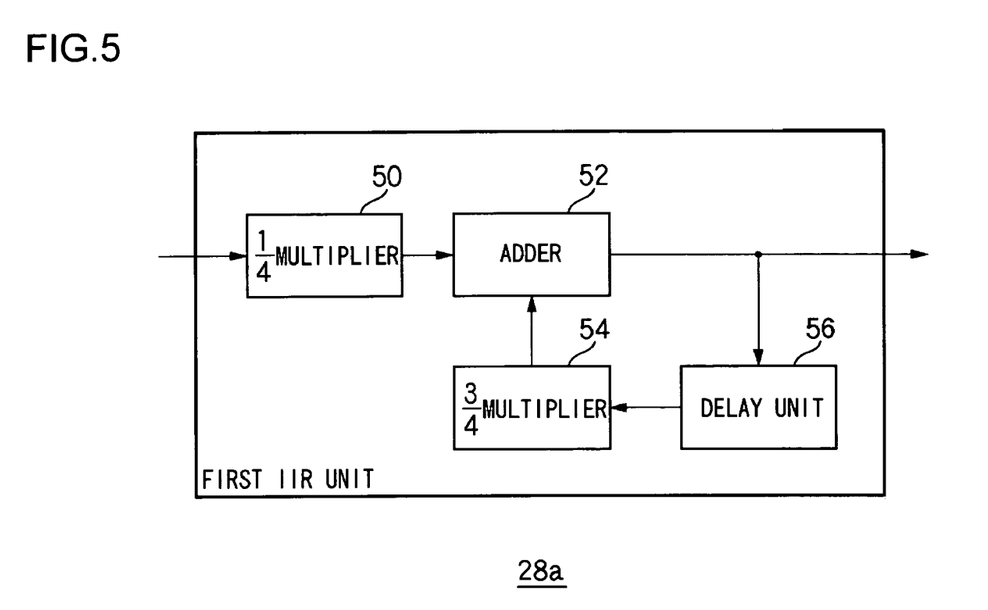
FIG. 5 illustrates a structure of a first IIR unit shown in FIG. 2.

FIG. 5 illustrates a structure of the first IIR unit 28a. The first IIR unit 28a includes a ¼ multiplier 50, an adder 52, a ¾ multiplier and a delay unit 56.

The ¼ multiplier 50 multipliers a signal inputted from the matched filter unit 26 of FIG. 2, by a coefficient "¼". In the case of digital signal processing, this means a bit shifting to a lower-order bit by 2 bits. The adder 52 adds an output signal from the ¼ multiplier 50 and an output signal from the ¾ multiplier 54, and outputs this summation result to the selector 30. The delay unit 56 delays the output signal from the adder 52. The ¾ multiplier 54 multiplies the signal delayed by the delay unit 56, by a coefficient "¾". With the above-described structure, the following processing as expressed by the following equation 3 will be carried out.

$$y(t) = \alpha \cdot x(t) + (1-\alpha)y \quad \text{(Equation 3)}$$

where x(t) indicates the signal inputted from the matched filter unit 26 at time t, y(t) indicates the signal outputted from the adder 52 at time t and a is α forgetting factor which is "¼" in FIG. 5.

Figures 6A, 6B:
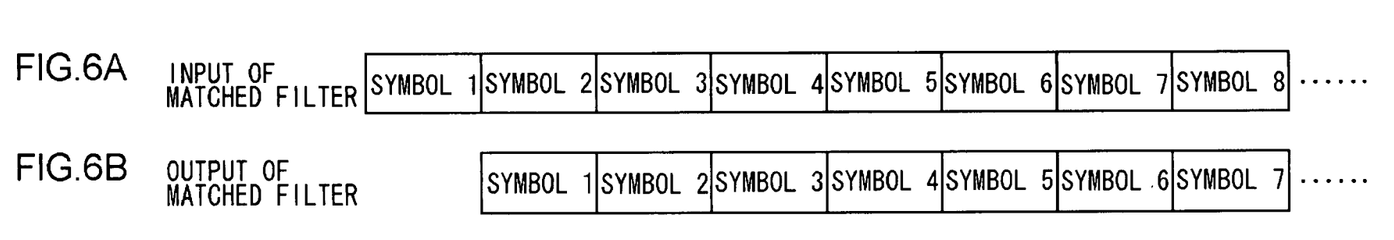
FIGS. 6A to 6C illustrate processing timings of processings at a matched filter unit and an IIR unit shown in FIG. 2.
Figure 6C:
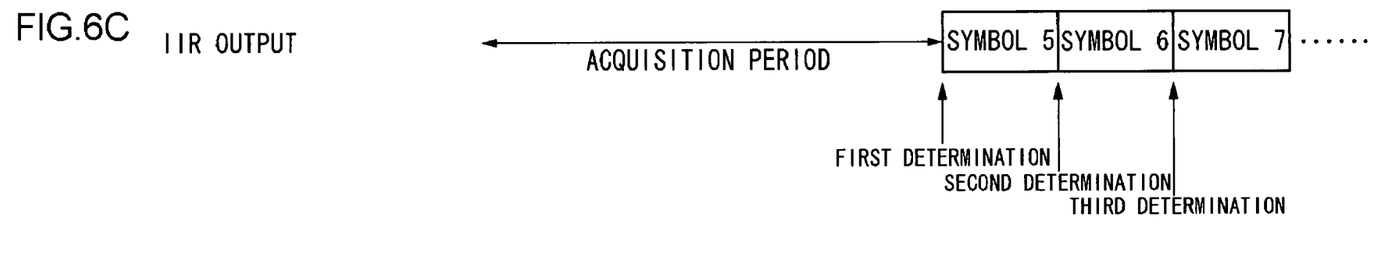

FIGS. 6A to 6C illustrate the timing of processings carried out at the matched filter unit 26 and an IIR unit 28. FIG. 6A shows timing of a signal inputted to the matched filter unit 26. The signals are inputted from "symbol 1" continuously. FIG. 6B shows timing of a signal outputted from the matched filter unit 26. FIG. 6B illustrates that the symbols from "symbol 1" onward are continuously outputted at timing of "one" symbol delayed from the signal inputted in FIG. 6A. FIG. 4C shows timing of a signal outputted from an IIR unit 28. In the case of IIR unit 28a shown in FIG. 5, a predetermined time period is required for filter acquisition, and the period of time equivalent to 4 symbols was needed for the IIR unit 28a to output a response of approximately 0.68. Thus, among the signals outputted from the matched filter unit 26 of FIG. 2, no effective signal is outputted in the first four symbols and the effective signals are outputted from "symbol 5" on. The selector 30 conducts the first determination, the second determination and the third determination to select the maximum value at the time of completing "symbol 4", "symbol 5" and "symbol 6", for example, respectively.

Figure 7A:
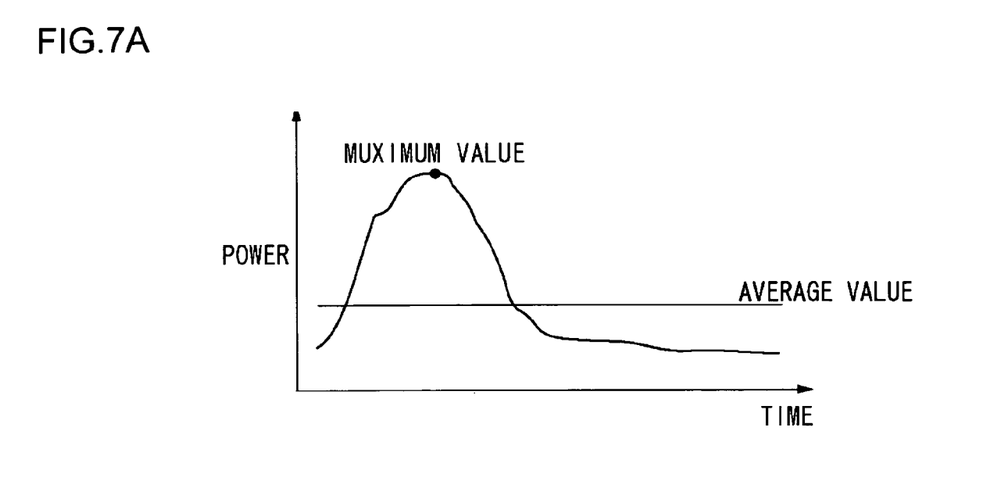
FIGS. 7A and 7B illustrate the principle of operations of a comparator and a decision unit shown in FIG. 2.
Figure 7B:
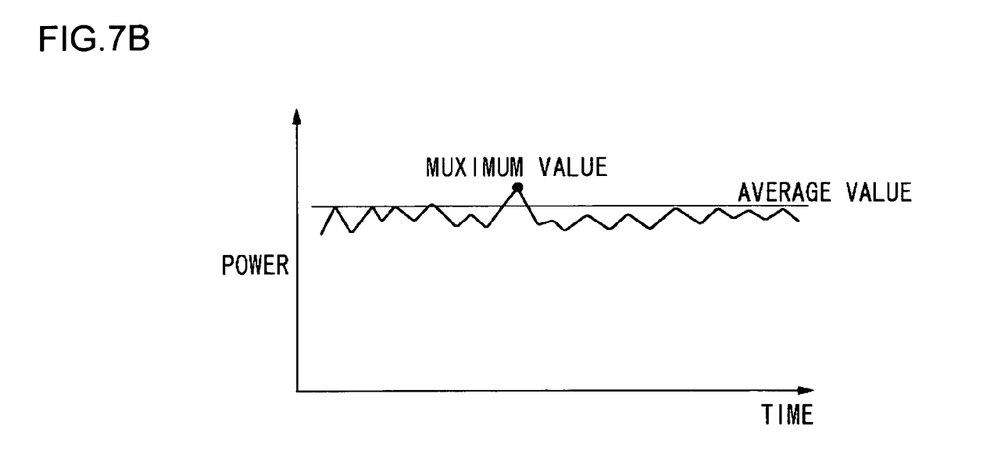

FIGS. 7A and 7B illustrate the principle of operations of the comparator 36 and the decision unit 38. FIG. 7A shows a case when a difference between the maximum value inputted from the selector 30 to the comparator 36 and the average value from the averaging unit 32 is large. As shown in FIG. 7A, since the overall noise level is low, the average value is low, too. As a result, the result of the division, namely, "the maximum value over the average value" becomes large. FIG. 7B shows case when a difference between the maximum value inputted from the selector 30 to the comparator 36 and the average value from the averaging unit 32 is small. As shown in FIG. 7B, since the overall noise level is high, the average value is high, too. As a result, the result of the division, namely, "the maximum value over the average value" becomes small. In the decision unit 38, it is determined that the signal has been detected if the result of division or "the maximum value over the average value" becomes larger than a value set by the coefficient unit 34. In this manner, since the detection of a signal is determined based on the ratio of the maximum value to the average value, the detection of a signal can be determined making a distinction between the case where the signal component is larger and the case where the noise component is larger even in the event that the maximum value hits a predetermined value. As a result, the signal can be accurately detected even in the environment where the noise level is high.

Figure 8A:
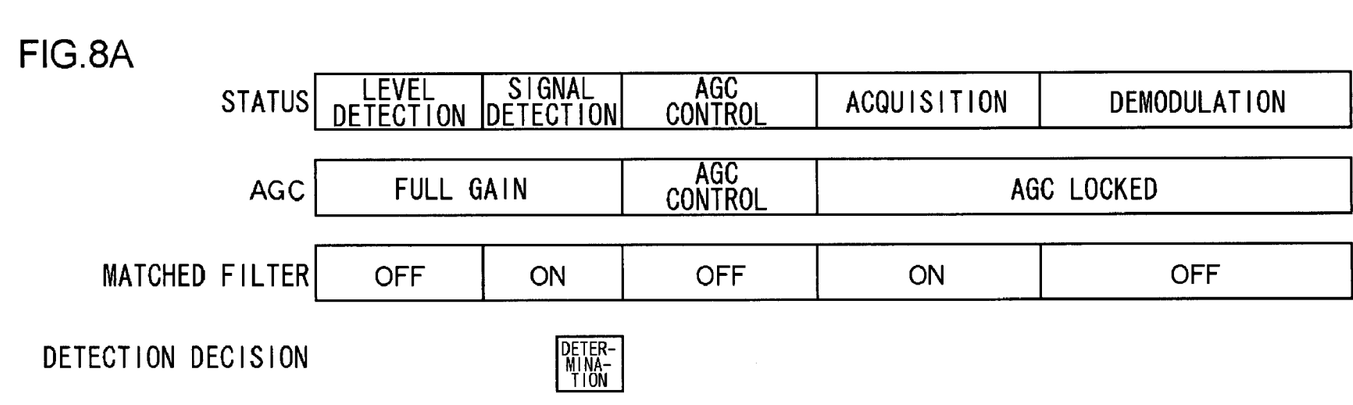
FIGS. 8A and 8B illustrate operation timings of the receiving apparatus shown in FIG. 2.

FIGS. 8A and 8B illustrate operation timings of a receiving apparatus 100. FIG. 8A shows operation timing of a conventional receiving apparatus for comparison with the present embodiment. For the simplicity of explanation, the same notations are given to the same components in the conventional apparatus as those in the present embodiment. "Status" indicates the status of each component in the receiving apparatus 100. "Level detection" is a state in which a component corresponding to the start determining unit 16 monitors the input of some sort of signal or noise. "Signal detection" is a state in which the detection unit 20 is detecting a signal to be processed. "AGC control" is a state in which the AGC unit 14 determines gain by carrying out automatic gain control. "Acquisition" is a state in which the timing synchronization is acquired based on correlation values outputted from the matched filter unit 26. It is to be noted here that FIG. 2 does not show any structural component to acquire the timing synchronization. "Demodulation" is a state in which the processing unit 22 perform demodulation.

"AGC" indicates the gain set by the AGC unit 14. The "AGC" is set to "full gain" over a period when the "status" is in both "level detection" and "signal detection". In a period when the "status" is "AGC control", an "AGC control" is performed so as to derive an optimum gain. Over a period when the "status" is in both "acquisition" and "demodulation", the "AGC" becomes "AGC locked", so that the "AGC" is fixed to the thus derived optimum gain. "Matched filter" indicates an ON/OFF operation of the matched filter unit 26. The "matched filter" is turned "OFF" when the "status" is "level detection" whereas the "matched filter" is turned "ON" when the "status" is "signal detection". And the "matched filter" is turned "OFF" when the "status" is "AGC control" whereas the "matched filter" is turned "ON" when the "status" is "acquisition" and it is turned "ON" when the "status" is "demodulation". "Detection decision" indicates a case when the decision unit 38 decides on the detection of a signal. And the "detection decision" conducts "determination" when the "status" is "signal detection" and in the vicinity of timing when the "signal detection" period is terminated.

Figure 8B:
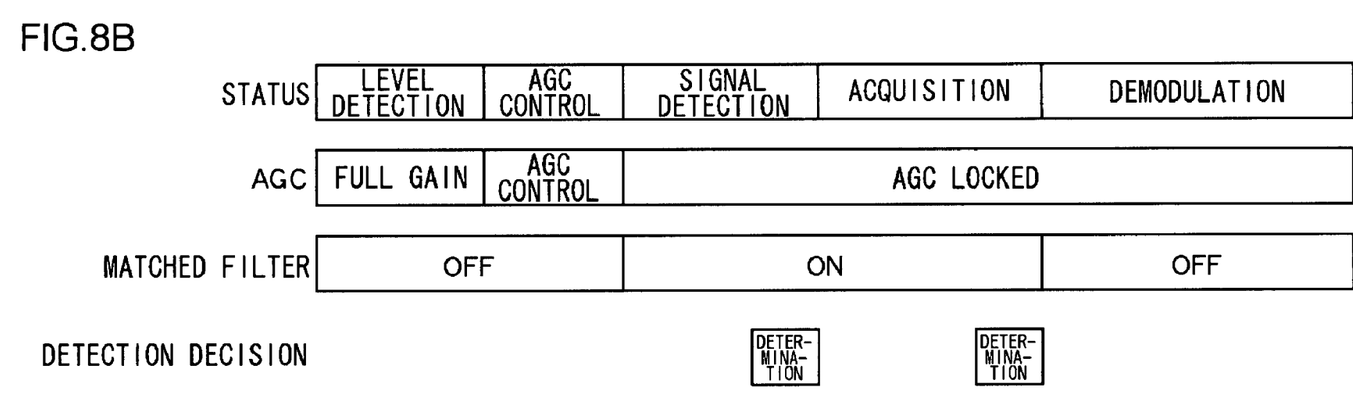

FIG. 8B shows operation timing of a receiving apparatus 100. The "status" in FIG. 8B of the present embodiment is such that the order of "AGC control" and "signal detection" is reversed in FIG. 8B compared with FIG. 8A. That is, the "signal detection" is executed after the "AGC control" is carried out. In the "AGC", the "signal detection" in the "status" is executed while the "AGC" is in the state of being "AGC-locked". The correspondence between the "matched filter" and the "status" is same as in FIG. 8A. As described above, since the order of the "AGC control" and the "signal detection" is reversed, the number of ON/OFF switchings in the matched filter unit 26 decreases and the operation of receiving apparatus 100 is stabilized in the present embodiment. The "determination" in "detection decision" is conducted at the same timing as in FIG. 8A, and the "determination" may be conducted again in the vicinity of timing when the "acquisition" in the "status" is terminated.

Figure 9A:
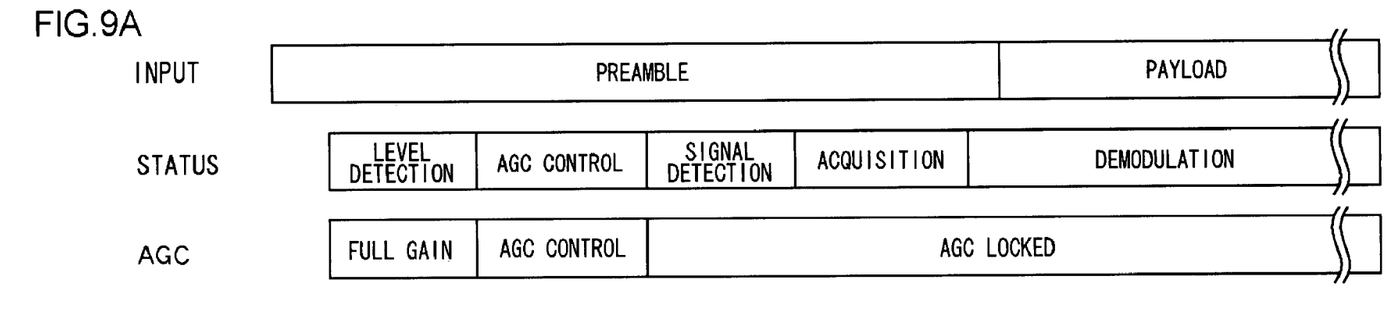
FIGS. 9A and 9B illustrate operation timings of the receiving apparatus shown in FIG. 2.
Figure 9B:
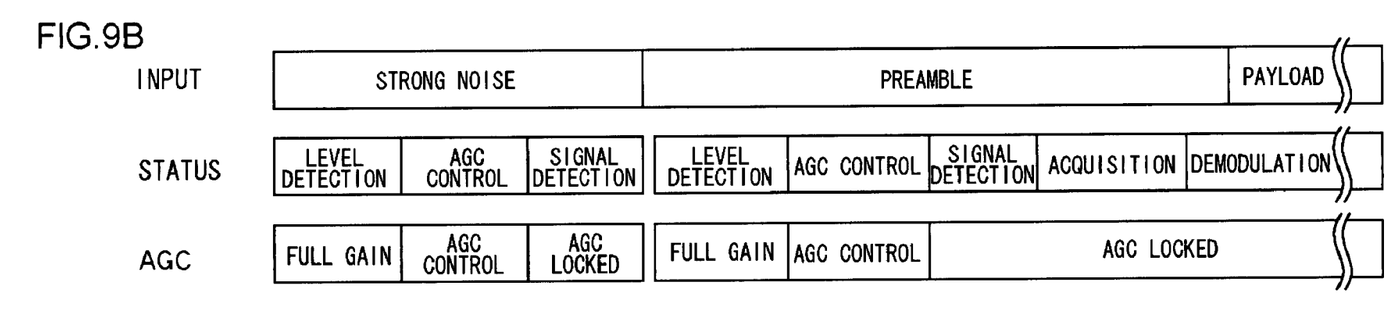

FIGS. 9A and 9B illustrate operation timings of a receiving apparatus 100. In FIG. 9A, the "status" of the receiving apparatus 100 described in FIG. 8B is combined with and related to the burst format of FIG. 1. Referring to FIG. 9A, "input" indicates the burst format of a signal inputted to the receiving apparatus 100. During the period of "preamble" of the "input", the receiving apparatus 100 carries out the statuses of "level detection", "AGC control", "signal detection" and "acquisition", and during the period of "payload" it carries out "demodulation". The relationship between the "status" and the "AGC" is the same as in FIG. 8B.

FIG. 9B shows operation timing of a receiving apparatus 100 when strong noise is inputted before the input of a burst signal. During the period of "strong noise" of "input", the receiving apparatus 100 carries out "level detection", "AGC control" and "signal detection". However, since the signal is not detected in this period, the receiving apparatus 100 then repeats the execution of the "signal detection". When a burst signal is inputted following the "strong noise" of the "input" while the execution of the "signal detection" is being repeated, the strength of inputted signals undergoes a drastic change. When the receiving apparatus 100 detects a great change in the inputted signals, the "status" of "signal detection" discontinues and returns to the "level detection". At this time, "AGC" is returned to "full gain" from "AGC locked", and this transition is called "AGC unlocking". During the "preamble" of the "input", the receiving apparatus 100 carries out the statuses of "level detection", "AGC control", "signal detection" and "acquisition", and during the period of "payload" it carries out "demodulation". The relationship between the "status" and the "AGC" is the same as in FIG. 8B.

Figure 10:
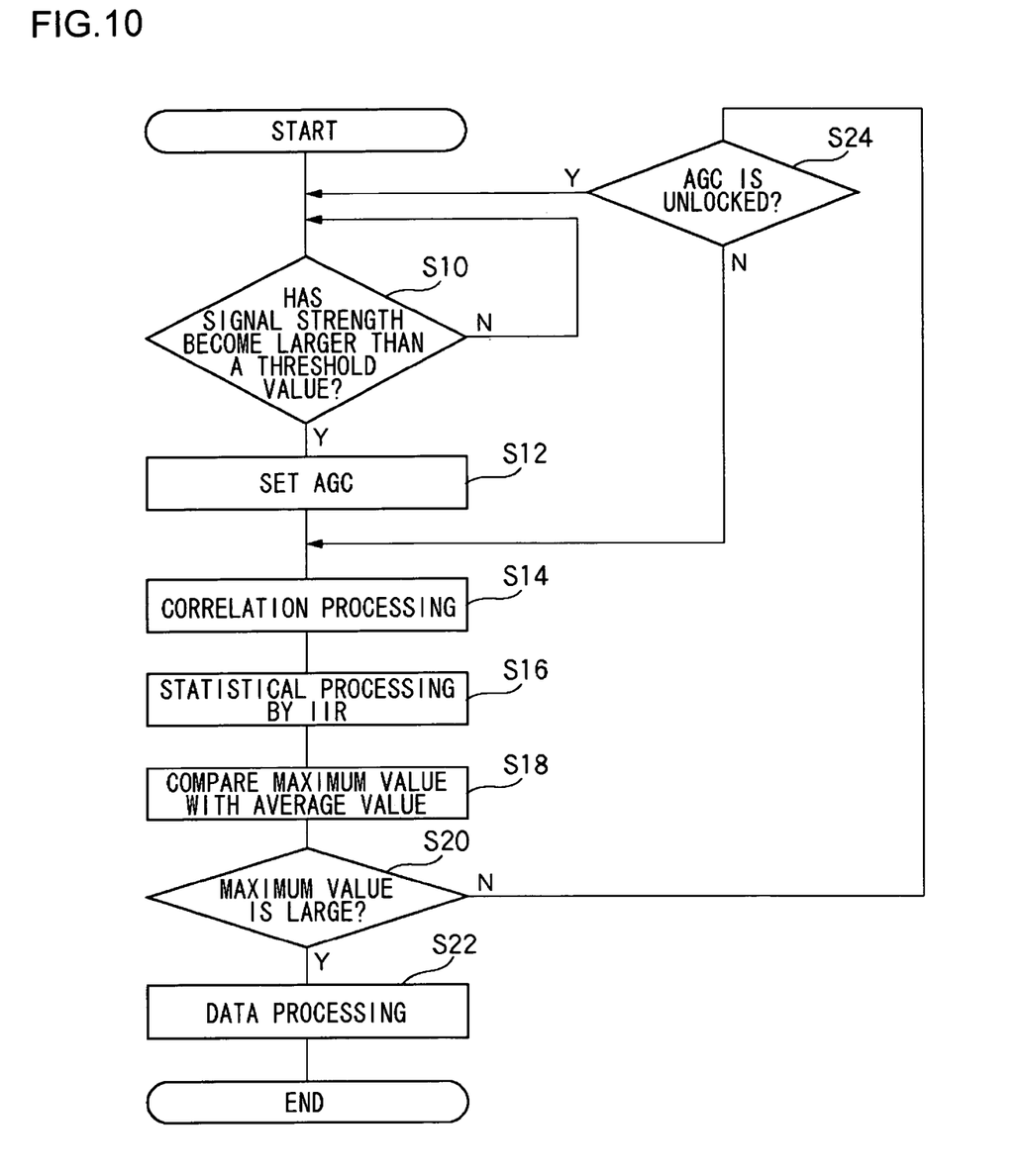
FIG. 10 is a flowchart showing a processing procedure of the receiving apparatus shown in FIG. 2.

FIG. 10 is a flowchart showing a processing procedure of a receiving apparatus 100. The start determining unit 16 determines if the signal strength becomes larger than a threshold value (S10). If the signal strength becomes greater than the threshold value (Y of S10), the AGC unit 14 sets an AGC (S12). If, on the-other hand, the signal strength is not greater than the threshold value (N of S10), the processing of step 10 will be repeated. The matched filter unit 26 performs mutual correlation processing with patterns of preamble stored beforehand (S14). The IIR units 28 perform statistical processing by IIR (S16). The selector 30 selects the maximum value from among the correlation values and the averaging unit 32 calculates an average value. The comparator 36 compares the maximum value with the average value (S18). And if the maximum value is greater than a predetermined threshold value (Y of S20), the processing unit 22 execute a data processing (S22). If the maximum value is not greater than the predetermined threshold value (N of S22), the above processing procedure will be carried out again. However, if the "AGC unlocking" occurs (Y of 24), the processing procedure returns to the processing of step 10. And if the "AGC unlocking" is not occurring (N of S24), it returns to step 14.

According to the first embodiment, a correlation processing for determining the detection of signals is carried out based on a signal whose gain is controlled by AGC, so that the noise components such as distortion and noise are suppressed and therefore the correlation values can be accurately derived. Furthermore, since the correlation values undergo statistical processing by IIR, the effect of noise can be reduced despite the fact that the circuit scale is small. Furthermore, since the detection of signals is done based on the ratio of the maximum value of correlation values to the average value thereof, the signals can be accurately and properly detected irrespective of the level of noise. Also, the interval between ON and OFF of a matched filter becomes longer, so that the processing as a whole is stabilized.

SECOND EMBODIMENT

A second embodiment according to the present invention relates to a transmitting apparatus of wireless LAN compliant with IEEE802.11b standard. CSMA is used in the wireless LAN of IEEE802.11b standard. And in CSMA the transmitting apparatus performs carrier sense before transmitting signals, and then transmits the signals if no signal is detected. A transmitting apparatus according to the second embodiment uses the signal detection technique described in the first embodiment for the carrier sense.

Figure 11:
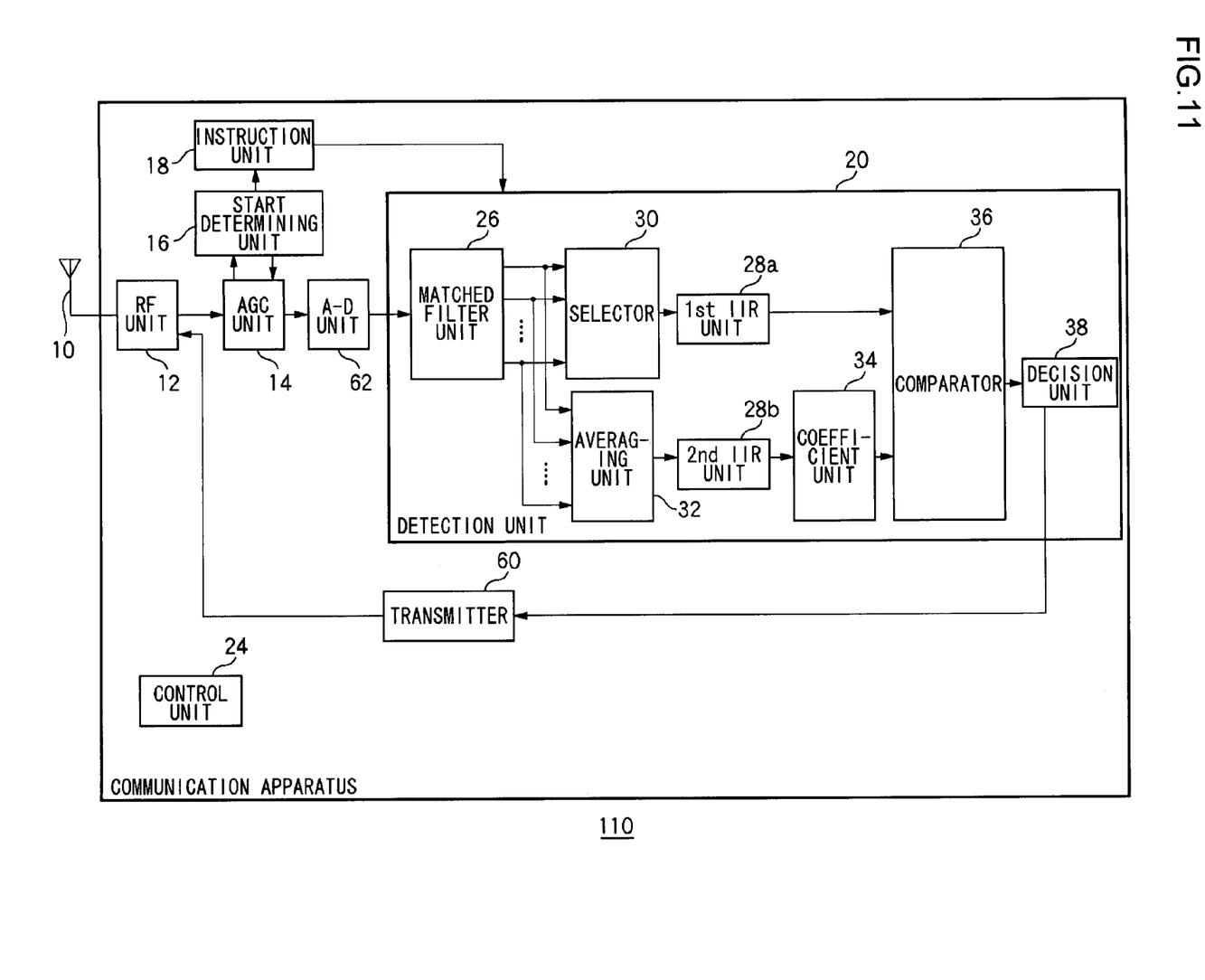
FIG. 11 illustrates a structure of a communication apparatus according to a second embodiment of the present invention.

FIG. 11 illustrates a structure of a communication apparatus 110 according to the second embodiment of the present invention. The communication apparatus 110 includes an RF unit 12, an AGC unit 14, an A-D unit 62, a start determining unit 16, an instruction unit 18, a detection unit 20, a transmitter 60 and a control unit 24. The detection unit 20 includes a matched filter unit 26, a first IIR unit 28a and a second IIR unit 28b, which are generically referred to as IIR units 28, a selector 30, an averaging unit 32, a coefficient unit 34, a comparator 36 and a decision unit 38. Differing from the first embodiment, the detection unit 20 performs carrier sense before transmitting signals.

An antenna 10, the RF unit 12, the AGC unit 14, the A-D unit 62, the start determining unit 16, the instruction unit 18 and the matched filter unit 26 operate the same way as those included in the receiving apparatus 100 shown in FIG. 2, and therefore the repeated explanation thereof will be omitted here. The selector 30 compares a plurality of correlation values outputted from the matched filter unit 26 symbol by symbol and selects a maximum value. The first IIR unit 28a performs statistical processing on the maximum value outputted from the selector 30. That is, though in the first embodiment the maximum value is selected after the statistical processing, in the second embodiment the statistical processing is performed after the selection of maximum value. Since the statistical processing is performed for each sampling timing according to the structure implemented in the first embodiment, the effect of noise can be reduced. In contrast thereto, a plurality of sampling timings as a whole undergo the statistical processing according to the structure implemented in second embodiment, so that the circuit scale can be made smaller. The averaging unit 32 calculates an average value of a plurality of correlation values symbol by symbol. The second IIR unit 28b performs statistical processing on the average value outputted from the averaging unit 32. The coefficient unit 34, the comparator 36 and the decision unit 38 operate the same way as those included in the receiving apparatus 100 shown in FIG. 2 and therefore the repeated explanation thereof will be omitted here.

The transmitter 60 transmits signals to be sent if the decision unit 38 detects no signal. The transmitter 60 includes a modulation unit and a spread unit which are not shown in FIG. 11.

According to the second embodiment, the signals to be received can be accurately detected and therefore the carrier sense prior to the transmission of signals can be executed correctly and accurately. Furthermore, since the correlation processing executed to determine the detection of signals is carried out based on signals, whose gain has been controlled by AGC, which are then amplified by the thus controlled gain, so that the noise components such as distortion and noise are suppressed and therefore the correlation values can be accurately derived. Furthermore, since the correlation values are subjected to the statistical processing by using IIR, the effect of noise can be reduced even though the circuit scale is small. Furthermore, since the detection of signals is done based on the ratio of the maximum value of correlation values to the average value thereof, the signals can be accurately and properly detected irrespective of the level of noise. Also, the interval between ON and OFF of a matched filter becomes longer, the processing as a whole is stabilized.

The present invention has been described based on the embodiments which are only exemplary. It is therefore understood by those skilled in the art that other various modifications to the combination of each component and process described above are possible and that such modifications are also within the scope of the present invention.

In the first and second embodiments, the matched filter unit 26 performs mutual correlation between the received signal and the preamble stored beforehand. However, the modes of carrying out the present invention are not limited to this. For example, the matched filter unit 26 may perform auto-correlation between the received signal and a signal received in the previous symbol by one symbol. In this modification, the correlation processing can be achieved even if the patterns of preamble are not stored beforehand. That is, it suffices as long as the presence or absence of a signal can be determined from the regularity or pattern of signals.

In the first and second embodiments, IIR filters are used as the IIR units 28. However, the modes of carrying out the present invention are not limited thereto and, for example, FIR filters may be used instead of IIR filters. In this modification, the statistical processing can be carried out the same way as with the IIR filters. That is, it suffices if filtering based on a predetermined characteristic is conducted.

Although the present invention has been described by way of exemplary embodiments and modifications, it should be understood that many other changes and substitutions may further be made by those skilled in the art without departing from the scope of the present invention which is defined by the appended claims.

What is claimed is:

1. A signal detecting apparatus, comprising:
   a sampling unit which samples respectively a plurality of symbols contained in a signal to be received, at an interval less than or equal to that of a symbol;
   a correlation unit which generates respectively a plurality of correlation values by performing correlation processing on the plurality of symbols sampled by said sampling unit;
   a statistical processing unit which associates respectively the plurality of correlation values to timings to be sampled included in an interval of one symbol, and performs statistical processing over the plurality of symbols on the plurality of associated correlation values at the respective timings;
   a selector which selects a maximum value from among the plurality of correlation values on which the statistical processing has been performed at the respective timings;
   an averaging unit which performs averaging processing on the plurality of correlation values on which the statistical processing has been performed at the respective timings; and
   a detector which determines detection of the signal to be received, based on the maximum value selected by said selector and the average correlation value on which the averaging processing has been performed.

2. A signal detecting apparatus according to claim 1, further comprising:
   a start determining unit which measures the strength of the signal to be received and determines a start of signal detection processing if the strength of the measured signal becomes greater than a predetermined threshold value; and
   an amplification unit which amplifies the strength of the plurality of symbols contained in the signal to be received, based on an automatic gain control, when the start of signal detection processing is determined and which outputs the amplified strength thereof to said sampling unit.

3. A signal detecting apparatus according to claim 2, wherein the statistical processing is performed by an IIR filter.

4. A signal detecting apparatus according to claim 3, wherein said detector divides the selected maximum value by the average correlation value on which the averaging processing has been performed and decides on detection of the signal to be received if the division result is greater than a predetermined threshold value.

5. A signal detecting apparatus according to claim 2, wherein said detector divides the selected maximum value by the average correlation value on which the averaging processing has been performed and decides on detection of the signal to be received if the division result is greater than a predetermined threshold value.

6. A signal detecting apparatus according to claim 1, wherein the statistical processing is performed by an IIR filter.

7. A signal detecting apparatus according to claim 6, wherein said detector divides the selected maximum value by the average correlation value on which the averaging processing has been performed and decides on detection of the signal to be received if the division result is greater than a predetermined threshold value.

8. A signal detecting apparatus according to claim 1, wherein said detector divides the selected maximum value by the average correlation value on which the averaging processing has been performed and decides on detection of the signal to be received if the division result is greater than a predetermined threshold value.

9. A method for detecting signals, the method comprising:

sampling respectively a plurality of symbols contained in a signal to be received, at an interval less than or equal to that of a symbol;

generating respectively a plurality of correlation values by performing correlation processing on the plurality of symbols sampled by said sampling;

associating respectively the plurality of correlation values to timings to be sampled included in an interval of one symbol;

performing statistical processing over the plurality of symbols on the plurality of associated correlation values at the respective timings;

selecting a maximum value from among the plurality of correlation values on which the statistical processing has been performed at the respective timings;

performing averaging processing on the plurality of correlation values on which the statistical processing has been performed at the respective timings; and determining detection of the signal to be received, based on the maximum value selected by said selecting and the average correlation value on which the averaging processing has been performed.

10. A receiving apparatus, comprising:

a sampling unit which samples respectively a plurality of symbols contained in a signal to be received, at an interval less than or equal to that of a symbol;

a correlation unit which generates respectively a plurality of correlation values by performing correlation processing on the plurality of symbols sampled by said sampling unit;

a statistical processing unit which associates respectively the plurality of correlation values to timings to be sampled included in an interval of one symbol, and performs statistical processing over the plurality of symbols on the plurality of associated correlation values at the respective timings;

a selector which selects a maximum value from among the plurality of correlation values on which the statistical processing has been performed at the respective timings;

an averaging processing unit which performs averaging processing on the plurality of correlation values on which the statistical processing has been performed at the respective timings;

a detector which determines detection of the signal to be received, based on the maximum value selected by said selector and the average correlation value on which the averaging processing has been performed; and a processing unit which processes the plurality of symbols in the event that the detection of the signal to be received is determined.

11. A transmitting apparatus, comprising:

a sampling unit which samples respectively a plurality of symbols contained in a signal to be received, at an interval less than or equal to that of a symbol;

a correlation unit which generates respectively a plurality of correlation values by performing correlation processing on the plurality of symbols sampled by said sampling unit;

a statistical processing unit which associates respectively the plurality of correlation values to timings to be sampled included in an interval of one symbol, and performs statistical processing over the plurality of symbols on the plurality of associated correlation values at the respective timings;

a selector which selects a maximum value from among the plurality of correlation values on which the statistical processing has been performed at the respective timings;

an averaging processing unit which performs averaging processing on the plurality of correlation values on which the statistical processing has been performed at the respective timings;

a detector which determines detection of the signal to be received, based on the maximum value selected by said selector and the average correlation value on which the averaging processing has been performed; and a transmitter which transmits a predetermined signal in the event that the signal to be received is not detected.

* * * * *